United States Patent
Sawada et al.

(10) Patent No.: US 6,932,057 B2
(45) Date of Patent: Aug. 23, 2005

(54) ENGINE CONTROL DEVICE

(75) Inventors: Yuichiro Sawada, Shizuoka (JP);
Hitoshi Hasegawa, Shizuoka (JP);
Michiyasu Takahashi, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/493,619

(22) PCT Filed: Oct. 22, 2002

(86) PCT No.: PCT/JP02/10948
§ 371 (c)(1),
(2), (4) Date: Apr. 23, 2004

(87) PCT Pub. No.: WO03/036069
PCT Pub. Date: May 1, 2003

(65) Prior Publication Data
US 2004/0261767 A1 Dec. 30, 2004

(30) Foreign Application Priority Data
Oct. 24, 2001 (JP) ...................................... 2001-326785

(51) Int. Cl.[7] ................................................. F02P 5/15
(52) U.S. Cl. ........................... 123/406.47; 123/406.53; 123/406.59
(58) Field of Search ....................... 123/339.11, 406.45, 123/406.47, 406.53, 406.54, 406.59, 406.6, 406.61, 406.62, 406.63, 617; 73/116, 117.3

(56) References Cited

U.S. PATENT DOCUMENTS

| | | | |
|---|---|---|---|
| 4,962,738 A | 10/1990 | Iwata | |
| 5,320,079 A | 6/1994 | Kuwabara | |
| 5,325,710 A | * 7/1994 | Morikawa | 123/406.63 |
| 5,613,473 A | 3/1997 | Angermaier | |
| 5,970,784 A | * 10/1999 | Genin | 73/117.3 |
| 6,170,322 B1 | 1/2001 | Yamazaki et al. | |
| 2004/0255902 A1 | * 12/2004 | Sawada et al. | 123/339.11 |

FOREIGN PATENT DOCUMENTS

| | | |
|---|---|---|
| EP | 0 640 762 | 3/1995 |
| EP | 196 38 010 | 3/1998 |
| EP | 0 987 421 | 3/2000 |
| JP | 63-71550 | 3/1988 |
| JP | 02-39572 | 3/1990 |
| JP | 10-227252 | 8/1998 |
| JP | 2000-265894 | 9/2000 |

* cited by examiner

Primary Examiner—Willis R. Wolfe, Jr.
(74) Attorney, Agent, or Firm—Hogan & Hartson, LLP

(57) ABSTRACT

To permit reliable occurrence of initial combustion at the start of an engine during which a stroke is not determined by only a crank pulse and to increase an engine speed.

During a period from when cranking is started until a stroke is detected, fuel is injected once every rotation of a crankshaft before an intake stroke (or an expansion stroke), and ignition is effected once every rotation of the crankshaft in the vicinity of the top dead center, thereby enabling initial combustion without involvement of reverse rotation of the engine. If a stroke is detected, fuel injection and ignition are effected once per cycle. When the engine speed fails to become equal to or higher than a predetermined speed, the ignition timing is set to a point before the compression dead center and in the vicinity of 10° toward advance, thereby immediately increasing the engine speed. Stroke detection is permitted when the engine speed has become equal to or higher than the predetermined speed, so that the engine speed becomes stable.

6 Claims, 11 Drawing Sheets

ENGINE CONTROL DEVICE

TECHNICAL FIELD

The present invention relates to an engine controller for controlling an engine, and more particularly, to an engine controller suitable for use in controlling an engine equipped with a fuel injector which injects fuel.

BACKGROUND ART

As a fuel injector called an injector has recently become pervasive, control of a fuel injection timing and control of quantity of fuel to be injected; that is, control of an air-fuel ratio, has become easy. As a result, fostering an increase in power, a reduction in fuel consumption, and cleansing of exhaust gases has become possible. In relation particularly to a timing at which fuel is to be injected from among the foregoing elements, strictly speaking, the state of an intake valve; that is, the phase state of a cam shaft, is detected, and fuel is usually injected in accordance with the thus-detected phase state. However, a so-called cam sensor to be used for detecting the phase state of the cam shaft is expensive. The cam sensor presents a problem of an increase in the size of a cylinder head of, particularly, a two-wheeled vehicle, and hence in many cases cannot be adopted. For this reason, an engine controller is proposed in, e.g., JP-A-10-227252, wherein the phase state of a crankshaft and an air intake pressure are detected, and the stroke state of a cylinder is then detected on the basis of these detection results. Use of this related-art technique enables detection of a stroke state without detecting the phase of a cam shaft. Hence, the fuel injection timing or the like can be controlled in accordance with the stroke state.

Detection of the phase state of the crankshaft requires formation of cogs in the crankshaft or an outer periphery of a member which rotates in synchronism with the crankshaft, detection of an approach to the cogs through use of a magnetic sensor or the like, transmission of a pulse signal, and detection of the pulse signal as a crank pulse. The phase state of the crankshaft is detected by numbering the thus-detected crank pulse. In order to effect numbering or the like, the cogs are often provided at uneven intervals. Specifically, the thus-detected crank pulse is characterized by a mark. The phase of the crankshaft is detected on the basis of the thus-characterized crank pulse. Intake pressures of the same phase acquired during two rotations of the crankshaft are compared with each other, to thus detect a stroke. Fuel injection timing and ignition timing are controlled in accordance with the stroke and the phase of the crankshaft.

However, upon start-up of the engine, a stroke cannot be detected unless the crank shaft has made at least two rotations. Particularly in the case of an engine for a two-wheeled vehicle having a small displacement and a single cylinder, the rotating state of the crankshaft fails to become stable at the early stage of engine start-up, and hence the state of the crank pulse does not become stable and difficulty is likely to be encountered in detecting a stroke. A method for effecting good control of an ignition timing and the quantity of fuel to be injected when a stroke is not detected is not yet proposed and remains unsolved.

The present invention is developed to solve the problems and aims at providing an engine controller capable of effecting good control of an ignition timing and the quantity of fuel to be injected upon start-up of the engine and detecting an accurate stroke.

DISCLOSURE OF INVENTION

To solve the problems, an engine controller according to claim 1 of the invention is characterized by comprising: cogs formed at uneven intervals on a crankshaft or an outer periphery of a member which rotates in synchronism with the crankshaft; crank pulse generation means which transmits a pulse signal in association with the crankshaft approaching the cogs; crankshaft phase detection means which detects as a crank pulse a pulse signal transmitted from the crank pulse generation means and detects the phase of the crankshaft from the crank pulse; intake pressure detection means for detecting intake pressure within an intake path of an engine; stroke detection means for detecting a stroke of the engine on the basis of the phase of the crankshaft detected by the crankshaft phase detection means and the intake pressure detected by the intake pressure detection means; engine control means for controlling a operating state of the engine on the basis of the stroke of the engine detected by the stroke detection means; and ignition timing setting means for use in a case where a stroke is not yet detected, which sets a predetermined phase of the crankshaft as ignition timing every rotation of the crankshaft at the start of the engine until the stroke detection means detects a stroke of the engine.

An engine controller according to claim 2 of the invention is characterized by the engine controller according to claims 1, further comprising engine speed detection means for detecting an engine speed, wherein the ignition timing setting means sets the top dead center or a point located in the vicinity thereof as ignition timing when the engine speed detected by the engine speed detection means is equal to or less than a predetermined speed.

An engine controller according to claim 3 of the invention is characterized by the engine controller according to claim 1 or 2, further comprising engine speed detection means for detecting an engine speed, wherein the ignition timing setting means sets a predetermined phase located toward advance with reference to the top dead center or a point located in the vicinity thereof as ignition timing when the engine speed detected by the engine speed detection means is equal to or higher than the predetermined speed.

An engine controller according to claim 4 of the invention is characterized by comprising: cogs formed at uneven intervals on a crankshaft or an outer periphery of a member which rotates in synchronism with the crankshaft; crank pulse generation means which transmits a pulse signal in association with the crankshaft approaching the cogs; crankshaft phase detection means which detects as a crank pulse a pulse signal transmitted from the crank pulse generation means and detects the phase of the crankshaft from the crank pulse; intake pressure detection means for detecting in take pressure within an intake path of an engine stroke detection means for detecting a stroke of the engine on the basis of the phase of the crankshaft detected by the crankshaft phase detection means and the intake pressure detected by the intake pressure detection means; engine control means for controlling a operating state of the engine on the basis of the stroke of the engine detected by the stroke detection means; and ignition timing setting means for use in a case where a stroke is not yet detected, which sets half the quantity of fuel required for one stroke cycle as the quantity of fuel per rotation of the crankshaft, at the start of the engine until the stroke detection means detects the stroke of the engine.

An engine controller according to claim 5 of the invention is characterized by the engine controller according to claim 4, further comprising engine temperature detection means for detecting the temperature of the engine, wherein the ignition timing-setting means sets, as the quantity of fuel required for one stroke cycle, the quantity of fuel computed on the basis of a smaller intake pressure level from among intake pressure levels detected by the intake pressure detection means when a difference between the intake pressure levels achieved in a predetermined phase of the crankshaft during the course of two rotations of the same detected by the crankshaft phase detection means is equal to or higher than a predetermined value and sets, as the quantity of fuel required for one stroke cycle, the quantity of fuel computed on the basis of the temperature of the engine detected by the engine temperature detection means when the intake pressure level difference is below the predetermined value.

An engine controller according to claim 6 of the invention is characterized by the engine controller according to claim 1 or 4, further comprising engine speed detection means for detecting an engine speed; and stroke detection enabling means for enabling the stroke detection means to detect a stroke of the engine when the engine speed detected by the engine speed detection means is equal to or higher than a predetermined speed.

BEST MODE FOR CARRYING OUT THE INVENTION

An embodiment of the invention will be described hereinbelow.

Figure 1:
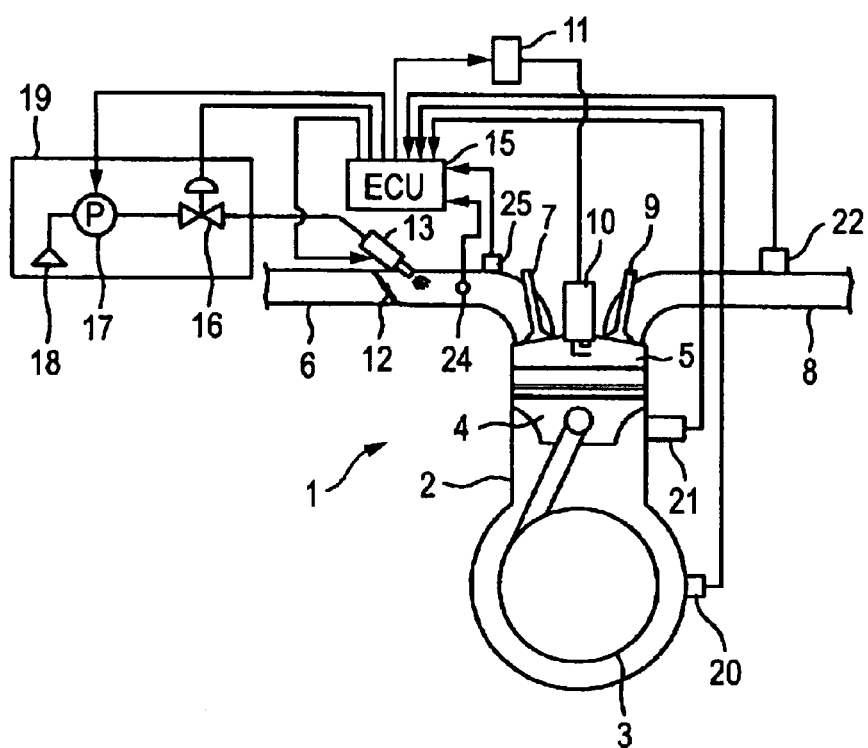
FIG. 1 is a schematic block diagram of a motorcycle engine and a controller thereof.

FIG. 1 is a schematic block diagram showing, e.g., an example motorcycle engine and an example controller thereof. An engine 1 is a single-cylinder four-cycle engine having a comparatively small displacement and has a cylinder body 2, a crankshaft 3, a piston 4, a combustion chamber 5, an intake pipe (an intake path) 6, an intake valve 7, an exhaust pipe 8, an exhaust valve 9, a spark plug 10, and an ignition coil 11. A throttle valve 12 to be opened and closed in accordance with an accelerator position is provided in the intake pipe 6. An injector 13 serving as a fuel injector is provided in the intake pipe 6 downstream from the throttle valve 12. The injector 13 is connected to a filter 18 provided in a fuel tank 19, a fuel pump 17, and a pressure control valve 16.

The operating state of the engine 1 is controlled by an engine control unit 15. Provided as means for detecting control inputs to the engine control unit 15; that is, the operating state of the engine 1, are a crank angle sensor 20 for detecting the rotation angle of the crankshaft 3 or the phase of the same; a cooling water temperature sensor 21 for detecting the temperature of the cylinder body 2 or the temperature of cooling water, i.e., the temperature of an engine main body; an exhaust air-fuel ratio sensor 22 for detecting an air-fuel ratio in the exhaust pipe 8; an intake pressure sensor 24 for detecting the pressure of intake air within the intake pipe 6; and an intake air temperature sensor 25 for detecting the inside temperature of the intake pipe 6; i.e., an intake air temperature. The engine control unit 15 receives detection signals output from the sensors and outputs control signals to the fuel pump 17, the pressure control valve 16, the injector 13, and the ignition coil 11.

Figure 2A:
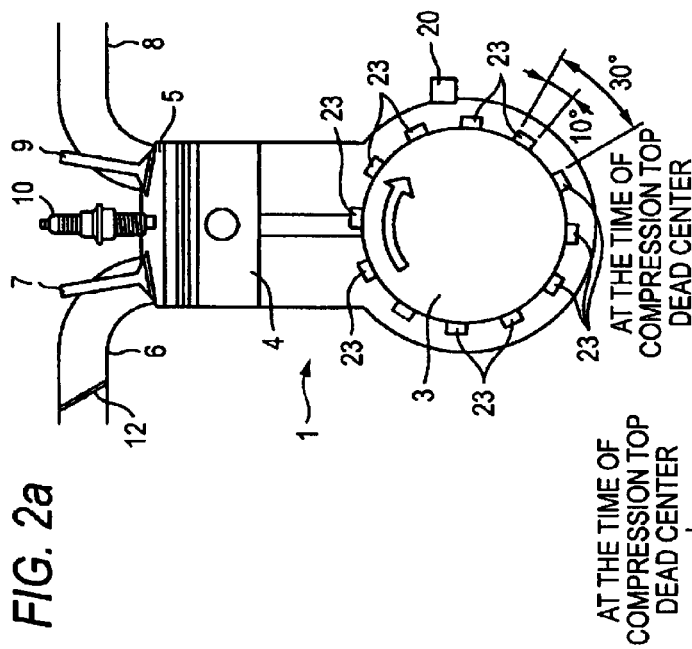
FIG. 2 is a descriptive view pertaining to the principle by which the engine shown in FIG. 1 transmits a crank pulse.

Here, the principle of a crank angle signal output from the crank angle sensor 20 will be described. In the embodiment, as shown in FIG. 2a, a plurality of cogs 23 are projectingly provided on an outer periphery of the crankshaft 3 at substantially uniform intervals, and an approach of the cog is detected by means of the crank angle sensor 20, such as a magnetic sensor or the like. A detection result is subjected to electric processing, as required, and a pulse signal is transmitted. A circumferential pitch between the cogs 23 is 30° in terms of a phase (rotational angle) of the crankshaft 3. The circumferential width of each cog 23 is set to 10° in terms of the phase (rotational angle) of the crankshaft 3. Only one pitch between cogs 23 does not comply with the pitch, and is double that between the other cogs 23. As indicated by a two dot chain line in FIG. 2a, the reason for this is a special setting, wherein no cog is provided in a place where a cog would be disposed if all the pitches are identical. This place corresponds to a non-uniform interval. This place will also be hereinafter called a cogless section.

Figure 2B:
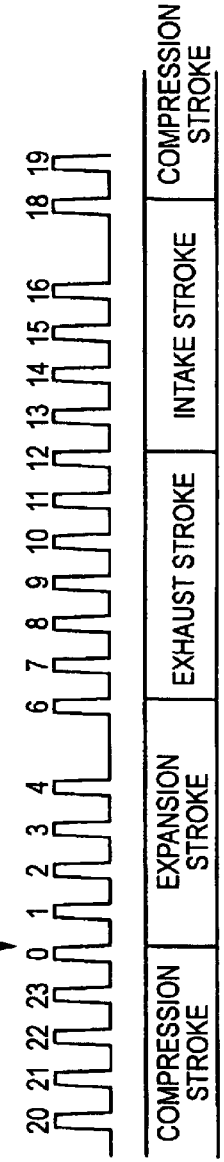

A pulse signal train produced by the respective cogs 23 when the crankshaft 3 is rotating at constant velocity appears as shown in FIG. 2b. FIG. 2a shows the state of the crankshaft achieved at a compression top dead center (which is also identical in shape with the state of the crankshaft achieved at an exhaust top dead center). A pulse signal immediately preceding the time when the compression top dead center is achieved is numbered (assigned a number) "0" in the drawing; the next pulse signal is numbered "1" in the drawing; the next pulse signal is numbered "2" in the drawing; and subsequent pulse signals are numbered up to "4" in the drawing. The cog 23 corresponding to the pulse signal "4" in the drawing is followed by the cogless section. However, the cogless section is counted as an extra cog as if a cog are present. Then, a pulse signal assigned to the next cog 23 is numbered "6" in the drawing. Numbering of the cogs is continued, whereupon a pulse signal "16" in the drawing is followed and approached by the cogless section. Hence, the cogless section is counted as an extra cog in the same manner as mentioned previously. A pulse signal assigned to the next cog 23 is numbered "18" in the drawing. When the crankshaft 3 has made two rotations, a complete cycle consisting of four strokes is completed. Hence, when pulse signals are numbered up to "23" in the drawing, a pulse signal assigned to the next cog 23 is again numbered "0" in the drawing. In principle, the pulse signal corresponding to the cog 23 numbered 0 should be immediately followed by the compression top dead center. As mentioned above, the detected pulse signal train or single pulse signals thereof are defined as crank pulses. When stroke detection is performed on the basis of the crank pulses in a manner which will be described later, a crank timing can be detected. The same is also achieved even when the cogs 23 are provided on an outer periphery of a member which rotates in synchronism with the crankshaft 3.

Figure 3:
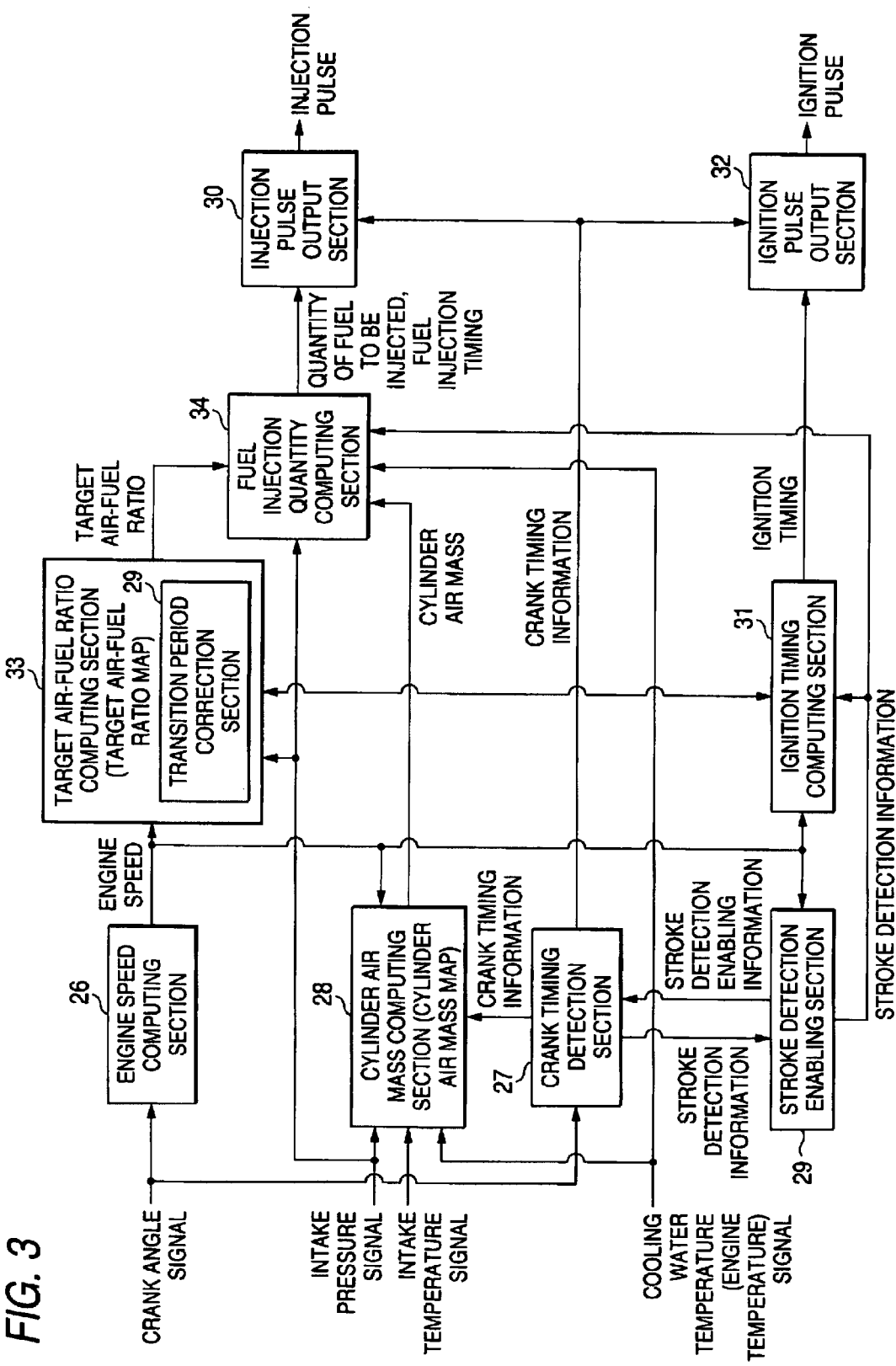
FIG. 3 is a block diagram showing an embodiment of the engine controller of the invention.

The engine control unit 15 is constituted of an unillustrated microcomputer or the like. FIG. 3 is a block diagram showing an embodiment of engine control processing to be performed by the microcomputer provided in the engine control unit 15. The computation processing is performed by an engine speed computing section 26 for computing an engine speed from the crank angle signal; a crank timing detection section 27 which detects crank timing information; i.e., a stroke state, from the crank angle signal and the intake pressure signal; a stroke detection enabling section 29 which loads the engine speed computed by the engine speed computing section 26, outputs stroke detection permission information to the crank timing detection section 27, and captures and outputs stroke detection information output from the crank timing detection section 27; a cylinder air mass computing section 28 which loads the crank timing information detected by the crank timing detection section 27 and computes a cylinder air mass (the quantity of intake air) from the air intake temperature signal, the cooling water temperature (engine temperature) signal, the intake pipe pressure signal, and the engine speed computed by the engine speed computing section 26; a target air-fuel ratio computing section 33 which computes a target air-fuel ratio from the engine speed computed by the engine speed computing section 26 and the intake pressure signal; a fuel injection quantity computing section 34 which computes the quantity of fuel to be injected and a fuel injection timing from the target air-fuel ratio computed by the target air-fuel ratio computing section 33, the intake pressure signal, the cylinder air mass computed by the cylinder air mass computing section 28, the stroke detection information output from the stroke detection enabling section 29, and the cooling water temperature signal; an injection pulse output section 30 which loads the crank timing information detected by the crank timing detection section 27 and outputs, to the injector 13, an injection pulse corresponding to the fuel injection quantity computed by the fuel injection quantity computing section 34 and to the fuel injection timing; an ignition timing computing section 31 which computes an ignition timing from the engine speed computed by the engine speed computing section 26, the target air-fuel ratio set by the target air-fuel ratio computing section 33, and the stroke detection information output from the stroke detection enabling section and an ignition pulse output section 32 which loads the crank timing information detected by the crank timing detection section 27 and outputs, to the ignition coil 11, an ignition pulse corresponding to the ignition timing set by the ignition timing computing section 31.

The engine speed computing section 26 computes, as an engine speed, the rotational speed of the crankshaft—which is an output shaft of the engine—from the time varying rate of the crank angle signal. Specifically, an instantaneous engine speed determined by dividing a phase between the adjacent cogs 23 by a time required to detect a corresponding crank pulse and an average value of engine speed determined by a moving average value of the crankshaft are computed.

Figure 4:
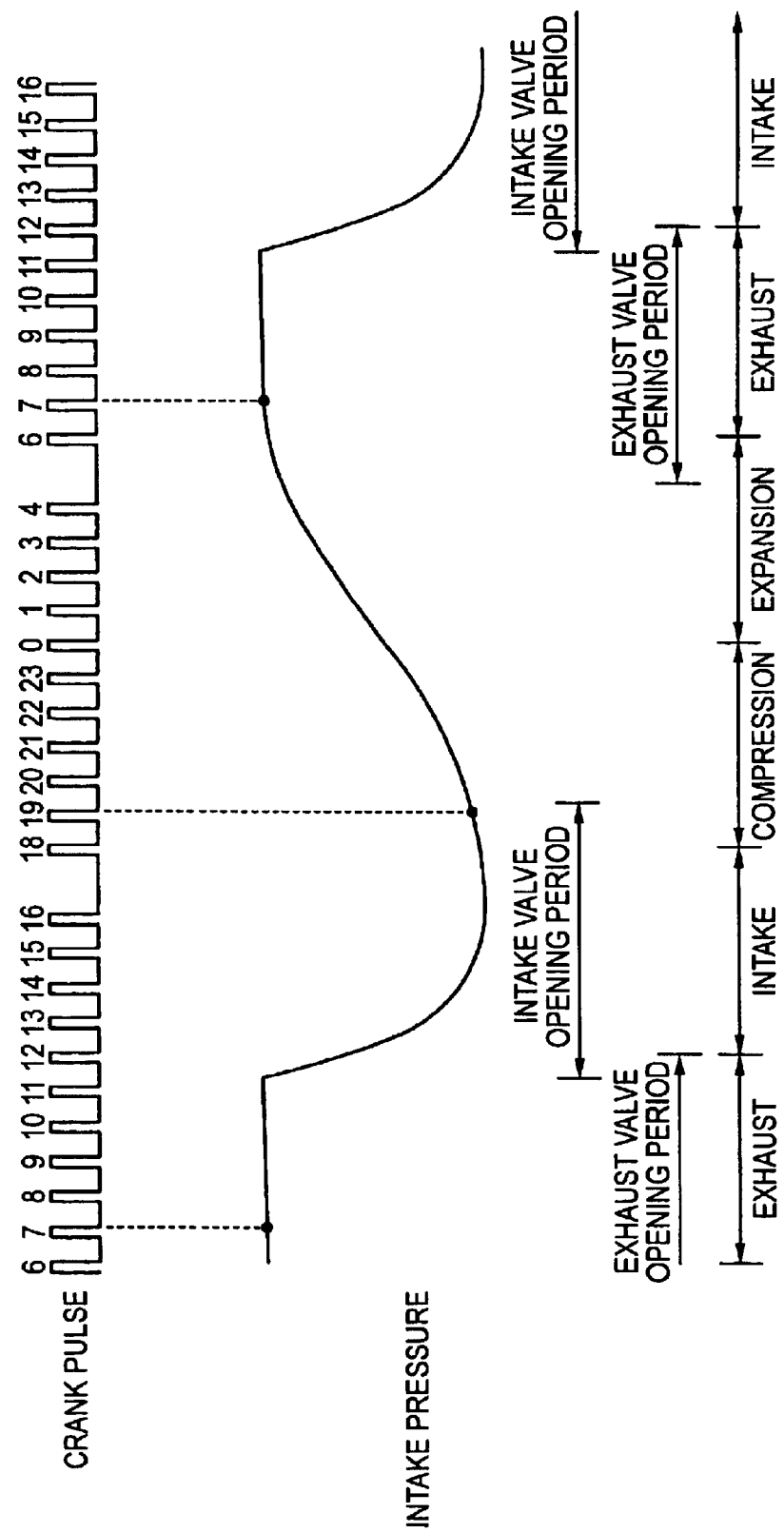
FIG. 4 is a descriptive view for detecting the state of a stroke on the basis of the phase of a crankshaft and an intake pressure.

The crank timing detection section 27 has a configuration analogous to that of a stroke determination device described in previously-described JP-A-10-227252. By means of the crank timing detection section, the stroke state of each cylinder is detected as shown in, e.g., FIG. 4, and the thus-detected state is output as crank timing information. Specifically, in a four-cycle engine the crankshaft and a cam shaft continuously rotate with a predetermined phase difference remaining therebetween. For instance, when the crank pulse is loaded in the manner as shown in FIG. 4, the crank pulse numbered "9" or "21" in the drawing, which corresponds to the fourth cog from the cog less section, represents either an exhaust stroke or a compression stroke. As is well known, the exhaust valve is opened during the exhaust stroke, and the intake value remains closed. Therefore, the intake pressure is high. In an initial stage of the compression stroke, the intake valve still remains open, and hence the intake pressure is low. Alternatively, even when the intake value remains closed, the intake pressure is already made low during the preceding intake stroke. Accordingly, the crank pulse "21" in the drawing achieved at the low intake pressure shows that the engine is in the compression stroke. The compression top dead center is achieved immediately after the cramp pulse numbered 0 in the drawing is achieved. In this way, when any of the stroke states is detected, the current stroke state can be detected in more detail, so long as intervals between the strokes are interpolated with the rotational speed of the crankshaft.

Figure 5:
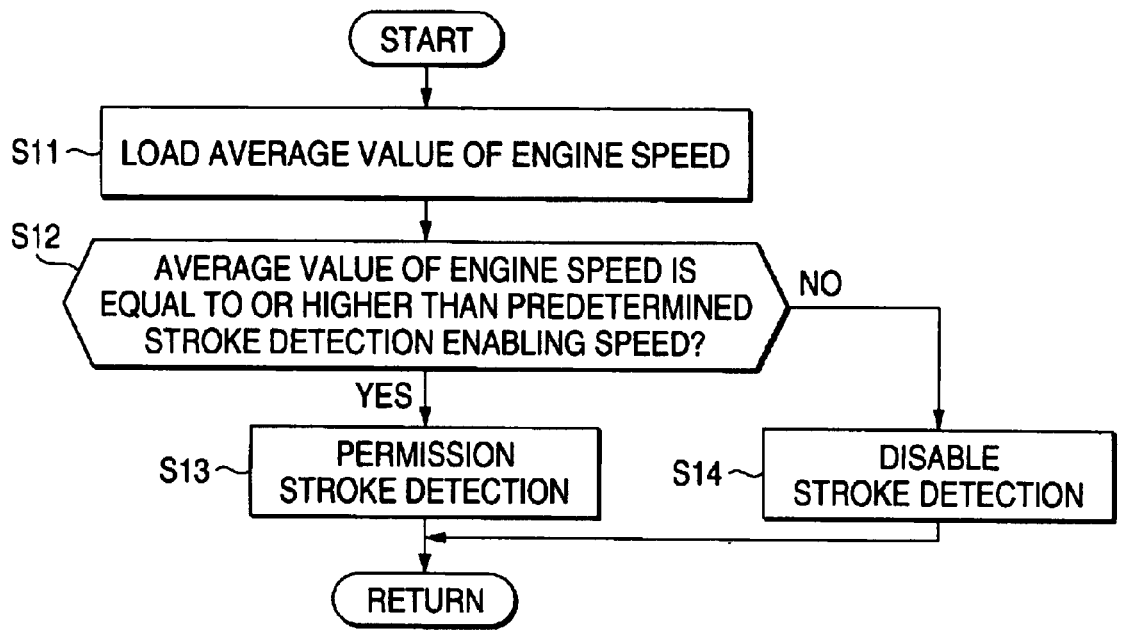
FIG. 5 is a flowchart showing computation processing to be performed by a stroke detection enabling section shown in FIG. 3.

In accordance with the processing shown in FIG. 5, the stroke detection enabling section 29 outputs, to the crank timing detection section 27, stroke detection enabling information. As mentioned above, when a stroke is detected from the crank pulse, the crankshaft must make at least two rotations. During this time, the crank pulses including the crank pulse assigned to the cogless section must remain stable. However, in the case of the single-cylinder engine having a comparatively small displacement such as that employed in the embodiment, the rotating state of the engine fails to become stable at the time of so-called cranking performed at start-up. For this reason, the rotating state of the engine is determined through the processing shown in FIG. 5, thereby enabling detection of a stroke.

The processing shown in FIG. 5 is executed while an input of, e.g., the crank pulse, is taken as a trigger. Although the flowchart does not include a step particularly intended for communication, the information obtained through processing is stored and updated in a storage device, whenever necessary. Further, information and a program, which are required for executing the processing, are loaded from the storage device at any time.

In relation to the processing, the average value of engine speed computed by the engine speed computing section 26 is loaded in step S11.

Next, processing proceeds to step S12, where a determination is made as to whether or not the average value of engine speed loaded in step S11 is equal to or greater than a previously-set stroke detection enabling predetermined speed which is higher than the engine speed obtained at the time of an initial combustion. When the average value of engine speed is higher than the stroke detection enabling predetermined speed, processing proceeds to step S13. If not, processing proceeds to step S14.

In step S13, processing returns to the main program after information indicating that stroke detection is permitted is output.

In step S14, processing returns to the main program after information indicating that stroke detection is disabled is output.

According to the processing, stroke detection is permitted at least when the average value of engine speed has become equal to or higher than the stroke detection enabling predetermined speed that is equal to or higher than the speed obtained at the initial combustion. Hence, the crank pulse becomes stable, and accurate stroke detection becomes feasible.

Figure 6:
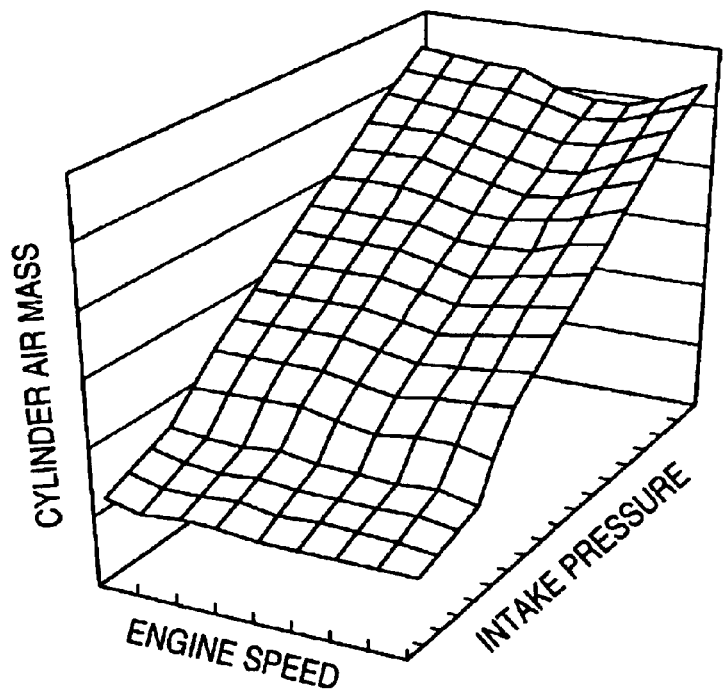
FIG. 6 is a map to be used for computing the mass of air stored in a cylinder, the mass being stored in a cylinder air mass computing section.

As shown in FIG. 6, the cylinder air mass computing section 28 has a three dimensional map to be used for computing the mass of air in the cylinder from the intake pressure signal and the engine speed computed by the engine speed computing section 26. The three dimensional map pertaining to the cylinder air mass can be measured through a comparatively simple test; that is, by means of measuring the mass of air in the cylinder achieved when the intake pressure is changed while the engine is being actually rotated at a predetermined speed. Hence, preparation of the map is easy. Further, if sophisticated engine simulation is available, the map can also be prepared through use of the simulation. Here, the mass of air in the cylinder changes depending on the temperature of the engine. Therefore, the cylinder air mass may be corrected through use of the cooling water temperature (engine temperature) signal.

Figure 7:
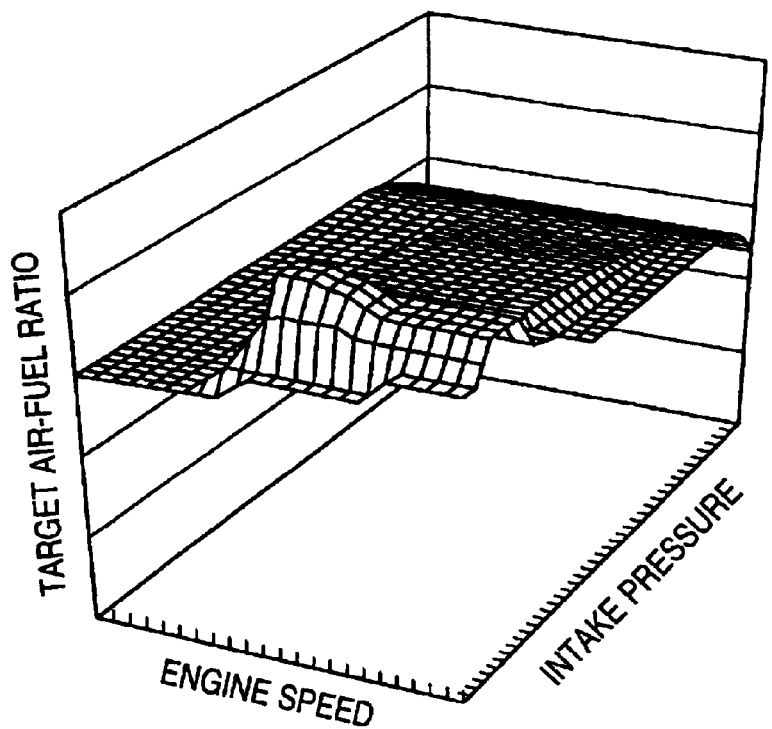
FIG. 7 is a map to be used for computing a target air-fuel ratio stored in a target air-fuel ratio computing section.

As shown in FIG. 7, the target air-fuel ratio computing section 33 is equipped with a three dimensional map to be used for computing a target air-fuel ratio from the intake pressure signal and the engine speed computed by the engine speed computing section 26. To a certain extent, this three-dimensional map can also be set up theoretically. The air-fuel ratio is usually in correlation with torque. When an air-fuel ratio is low; that is, when fuel content is high and air content is low, torque is increased whereas efficiency decreases. Conversely, when the air-fuel ratio is high; that is, when fuel content is low and air content is high, torque decreases whereas efficiency improves. A state in which the air-fuel ratio is low is called a rich state, whilst a state in which the air-fuel ratio is high is called a lean state. The leanest state is a so-called ideal air-fuel ratio or is called a stoichiometric state corresponding to a air-fuel ratio at which gasoline burns completely; that is, 14.7. The engine speed means the operating state of the engine. In general, when the engine is in a high revolution range, the air-fuel ratio is increased; and, when the engine is in a low-revolution range, the air-fuel ratio is decreased. The reason for this is that torque response is increased at the low revolution range and that the responsiveness of the rotating speed is increased in the high revolution range. Here, the intake pressure means the loaded condition of the engine, such as throttle opening. Generally, when the loaded condition of the engine is heavy; that is, when throttle opening is large, and the intake pressure is high, the air-fuel ratio is decreased. When the loaded condition of the engine is light; that is, when the throttle opening is small, and the intake pressure is low, the air-fuel ratio is increased. The reason for this is that emphasis is placed on torque when the loaded condition of the engine is heavy and that emphasis is placed on efficiency when the loaded condition of the engine is light.

As mentioned above, the target air-fuel ratio is a numeral whose physical meaning is easy to ascertain. Accordingly, the target air-fuel ratio can be set to a certain extent in accordance with a required output characteristic of the engine. As a matter of course, it goes without saying that tuning may be performed in accordance with the output characteristic of the engine of an actual vehicle.

Figure 8:
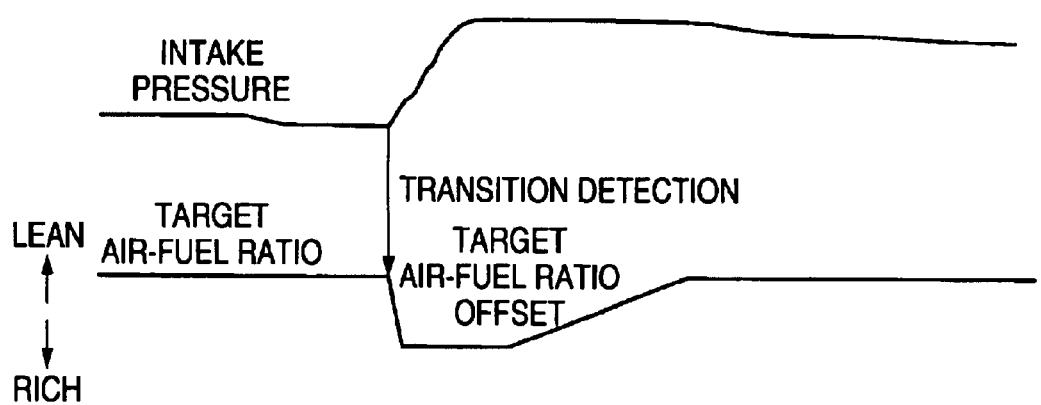
FIG. 8 is a descriptive view showing operation of a transition period correction section.

The target air-fuel ratio computing section 33 has a transition period correction section 29 which, detects the transient period of operating state of the engine from the intake pressure signal; specifically, the accelerating and decelerating states of the engine, and corrects the air-fuel ratio in accordance with the thus-detected states. As shown in, e.g., FIG. 8, the intake pressure also stems from throttle operation. Hence, when the intake pressure increases, the engine is considered to be in an accelerating state in which demand exists for opening of the throttle to achieve acceleration. If such an accelerating state is detected, the target air-fuel ratio is temporarily set to the rich side in accordance with the detected accelerating state. Subsequently, the air-fuel ratio is reset to the original target air-fuel ratio. An existing method can be utilized as a way to reset the air-fuel ratio to the original air-fuel ratio, wherein, for example, a weighting coefficient to be used for determining a weighted average value between the air-fuel ratio set to the rich side during a transition period and the original target air-fuel ratio, is gradually changed. Conversely, if the decelerating state is detected, the air-fuel ratio may be set to a position closer to the lean side with reference to the original target air-fuel ratio, thereby placing emphasis oh efficiency.

Figure 9:
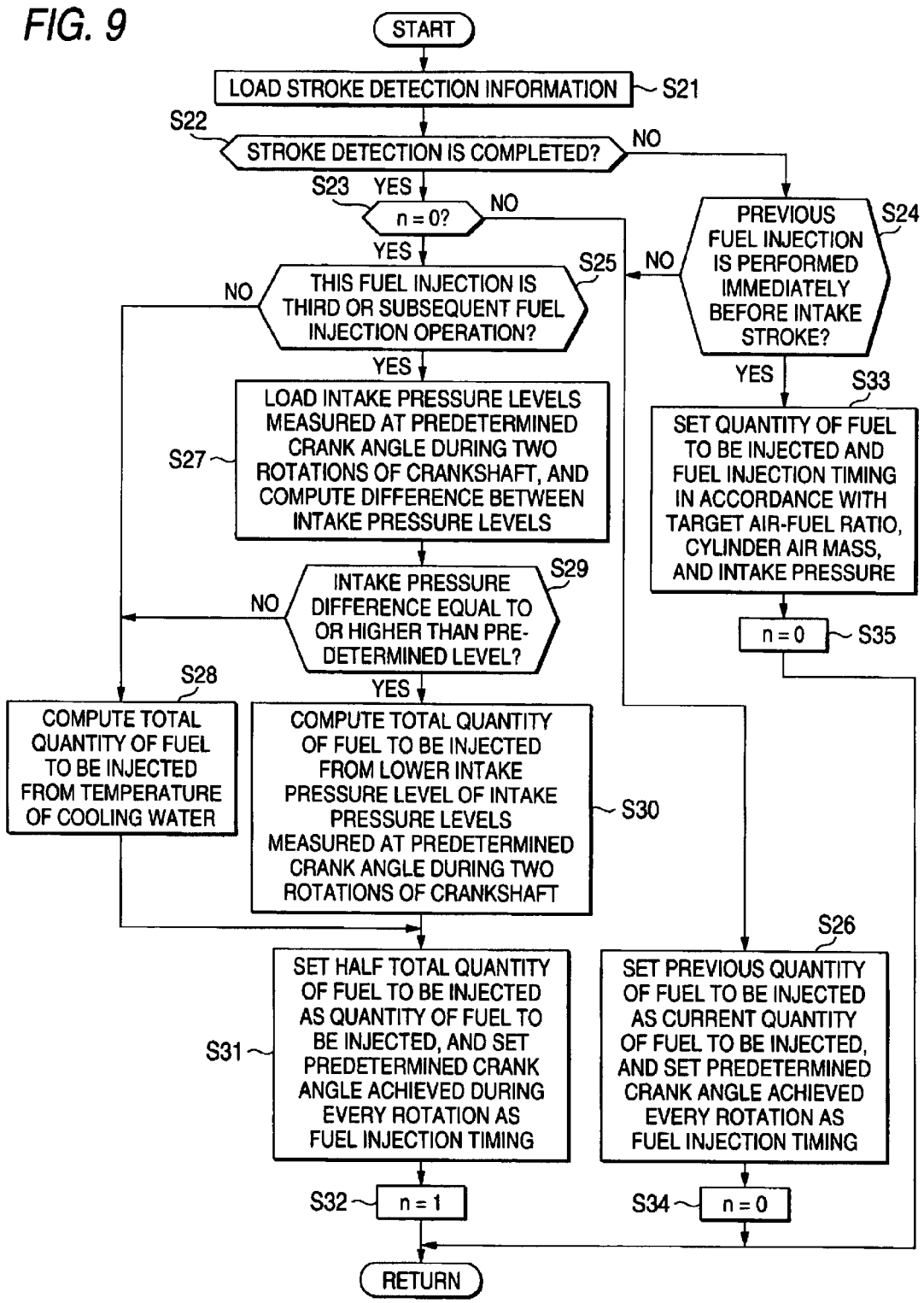
FIG. 9 is a flowchart showing computation processing to be performed by a fuel injection quantity computing section shown in FIG. 3.

In accordance with the processing shown in FIG. 9, the fuel injection quantity computing section 34 computes and sets the quantity of fuel to be injected and fuel injection timing at the start-up of the engine and during a normal operating state. The processing shown in FIG. 9 is executed while an input of the crank pulse is taken as a trigger. Here, the flowchart is not provided with a step particularly intended for communication. However, the information obtained through processing is updated and stored in the storage device, whenever necessary. Information and a program, which are required by, the processing, are loaded from the storage device at any time.

In relations to the processing, the stroke detection information output from the stroke detection enabling section 29 is loaded in step S21.

Processing then proceeds to step S22, where a determination is made as to whether or not the stroke detection to be performed by the crank timing detection section 27 remains to be completed. If the stroke detection remains to be completed, processing proceeds to step S23. If not, processing proceeds to step S24.

In step S23, a determination is made as to whether or not a fuel injection counter "n" is 0. When the fuel injection counter "n" is 0, processing proceeds to step S25. If not, processing proceeds to step S26.

In step S25, a determination is made as to whether or not fuel injection to be performed from now on is the third fuel injection operation or a subsequent fuel injection operation since the engine is started. When the fuel injection is the third fuel injection operation or a subsequent fuel injection operation, processing proceeds to step S27. If not, processing proceeds to step S28.

In step S27, during a period of two rotations of the crankshaft, intake pressure obtained at a preset given crank angle. i.e., intakes pressure obtained at the crank pulse "6" or "18" in FIGS. 2 and 4 in the embodiment, is loaded from, e.g., an unillustrated intake pressure storage section. A difference between the intake pressure levels is computed, and processing proceeds to step S29.

In step S29, a determination is made as to whether or not the intake pressure difference computed in step S28 is equal to or higher than, e.g., such a predetermined level that a stroke can be identified to a certain extent. When the intake pressure difference is equal to or higher than a predetermined level, processing proceeds to step S30. If not, processing proceeds to step S28.

In step S30, the total quantity of fuel to be injected is computed from any smaller intake pressure level of the intake pressure levels achieved at the predetermined crank angles during the two rotations of the crankshaft loaded in step S27, and processing proceeds to step S31.

In step S28, the temperature of cooling water; i.e., the temperature of the engine, is loaded. For instance, the lower the temperature of cooling water, the greater the quantity of fuel to be injected. Thus, the total quantity of fuel to be injected is computed in accordance with the temperature of cooling water, and processing proceeds to step S31. The total quantity of fuel to be injected computed in step S28 or S30 signifies the quantity of fuel which is to be injected once before the intake stroke during one cycle; that is, during two, rotations of the crankshaft. Accordingly, if the stroke is already detected and the fuel whose quantity corresponds to the temperature of cooling water is injected once before the intake stroke, the engine appropriately rotates in accordance with the temperature of cooling water; that is, the temperature of the engine.

In step S31, half the total quantity of fuel to be injected set in step S30 is set as the quantity of fuel to be injected this time. In the embodiment, a predetermined crank angle; that is, a trailing edge of the crank pulse "10" or "22" shown in FIGS. 2 and 4, is set for fuel injection timings for each rotation, i.e., every rotation of the crankshaft, and processing proceeds to step S32.

In step S32, the fuel injection counter is set to "1," and processing then returns to the main program.

In step S24, a determination is made as to whether or not the previous fuel injection is performed immediately before the intake stroke. If the previous fuel injection is performed immediately before the intake stroke, processing proceeds to step S33. If not, processing proceeds to step S26.

In step S26, the previous quantity of fuel to be injected is set to the quantity of fuel to be injected this time. As in step S31, the predetermined crank angle is set to a fuel injection timing every rotation; that is, every rotation of the crankshaft, and processing proceeds to step S34.

In step S34, the fuel injection counter is set to "0," and processing returns to the main program.

In step S33, the quantity of fuel to be injected and a fuel injection timing to be achieved during a normal operation, both corresponding to the target air-fuel ratio, the cylinder air mass, and the intake pressure, are set, and processing proceeds to step S35. Specifically, the mass of required fuel in the cylinder can be determined by dividing the cylinder air mass computed by the cylinder air mass computing section 28 by the target air-fuel ratio computed by the target air-fuel ratio computing section 33. A fuel injection time can be determined by multiplying the thus obtained mass of fuel with, e.g., a flow rate characteristic of the injector 13. The quantity of fuel to be injected and the fuel injection timing can be computed from the fuel injection time.

In step S34, the fuel injection counter is set to "0," and processing returns to the main program.

In relation to the processing, in a case where the stroke detection to be performed by the crank timing detection section 27 is not yet completed, if fuel is originally injected once per cycle before the intake stroke, half the total quantity of fuel which permits appropriate rotation of the engine is injected once at a predetermined crank angle, every rotation of the crankshaft. As a result, as will be described later, at start-up of the engine only half the required fuel may be taken in during the first intake stroke since cranking is started. If ignition is effected at the compression top dead center or the neighborhood thereof, combustion is achieved without fail, thereby starting the engine without fail. As a matter of course, when fuel required is taken in during the first intake stroke from the beginning of cranking operation; that is, when the fuel injected at one time can be taken in twice every rotation of the crankshaft, sufficient force derived from combustion is obtained, thereby enabling start of the engine without fail.

Even when the stroke is detected, if previous fuel injection is not effected immediately before the intake stroke; for instance, when the previous fuel injection is effected before the exhaust stroke, only half the quantity of fuel required to be injected is squirted. Hence, fuel which is equal in quantity to the previously injected fuel is squirted, whereby required fuel is taken in the next intake stroke. As a result, sufficient force derived from combustion is obtained, thereby running the engine.

If detection of the stroke is not yet completed, there is loaded a preset given crank angle achieved during two rotations of the crankshaft; specifically, the intake pressure corresponding to the crank pulse "6" or "18" shown in FIGS. 2 and 4; that is, the intake pressure achieved during the intake stroke or the intake pressure achieved during the expansion stroke. A difference between intake pressure levels is computed. As mentioned previously, if the throttle valve is not abruptly opened considerably wide, a corresponding pressure difference exists between the intake pressure achieved during the intake stroke and the intake pressure achieved during the expansion stroke. Hence, when the computed intake pressure difference is equal to or greater than a predetermined value at which stroke detection is possible, any lower intake pressure level of the pressure levels is taken as intake pressure for the intake stroke. The total quantity of fuel to be injected is set in accordance with the intake pressure; that is, the intake pressure corresponding to a certain degree of opening of the throttle, whereby an increase in engine speed corresponding to the degree of opening of the throttle can be ensured.

When a difference in the intake pressure levels achieved at the predetermined crank angles during the course of two rotations of the crankshaft is under a predetermined value or when fuel is injected immediately after the engine is started, the total quantity of fuel to be injected is set in accordance with the temperature of cooling water; i.e., the temperature of the engine. As a result, rotation of the engine can be started without fail at least against friction.

Figure 10:
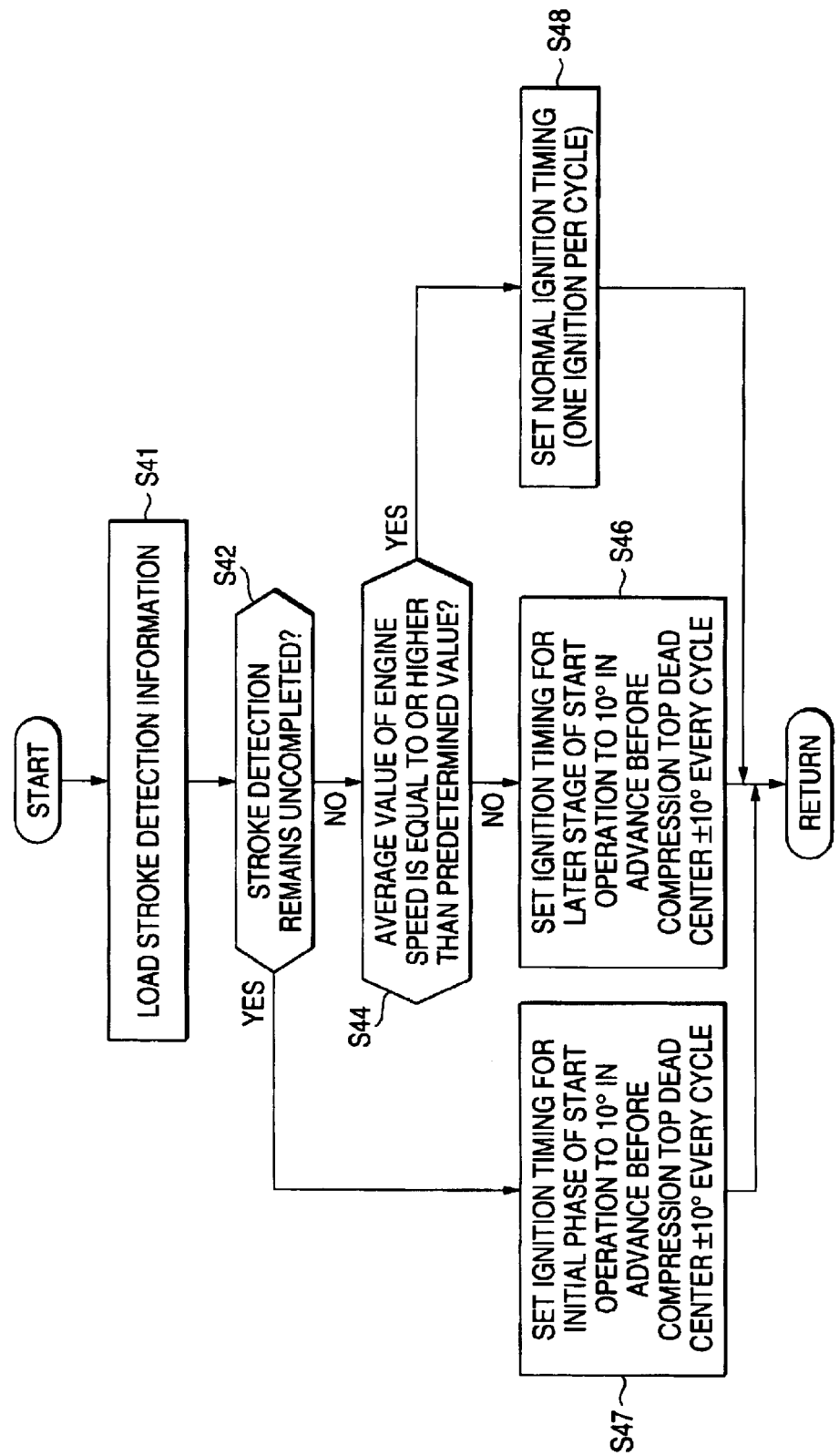
FIG. 10 is a flowchart showing computation processing to be performed by an ignition timing computing section shown in FIG. 3.

In accordance with the processing shown in FIG. 10, the ignition timing computing section 31 computes and sets an ignition timing at the start-up of the engine and during normal operation of the same. The processing shown in FIG. 10 is executed while an input of the crank pulse is taken as a trigger. Although the flowchart is not equipped with a step particularly intended for communication, the information obtained through processing is stored and updated in a storage device, whenever necessary. Further, information and a program, which are required for executing the processing, are loaded from the storage device any time.

In relation to the processing, the stroke detection information output from the stroke detection enabling section 29 is loaded in step S41.

Processing proceeds to step S42, where a determination is made as to whether or not stroke detection operation performed by the crank timing detection section 27 remains uncompleted. If the stroke detection operation remains uncompleted, processing proceeds to step S47. If not, processing proceeds to step S44.

In step S47, for instance, at the start-up of the engine, cranking is started but force derived from an initial combustion is not yet generated, and hence the engine speed is low and unstable. For this reason, ignition timing to be employed at the initial stage of the start is set to the top dead center (where neither compression nor exhaust is performed) every rotation of the crankshaft; that is, the trailing edge of the crank pulse "0" or "12" shown in FIGS. 2 and 4, ±a crankshaft rotational angle of 10°. Processing then returns to the main program. Here, the expression "±the crankshaft rotational angle of 10" factors in electrical or mechanical responsiveness. Substantially, ignition is performed simultaneously with the trailing edge of the crank pulse "0" or "12" shown in FIG. 2 or 4.

In step S44, a determination is made as to whether or not the average value of engine speed is equal to or higher than a predetermined speed. If the average value of engine speed is equal to or higher than the predetermined speed, processing proceeds to step S48. If not, processing proceeds to step S46.

Figure 11:
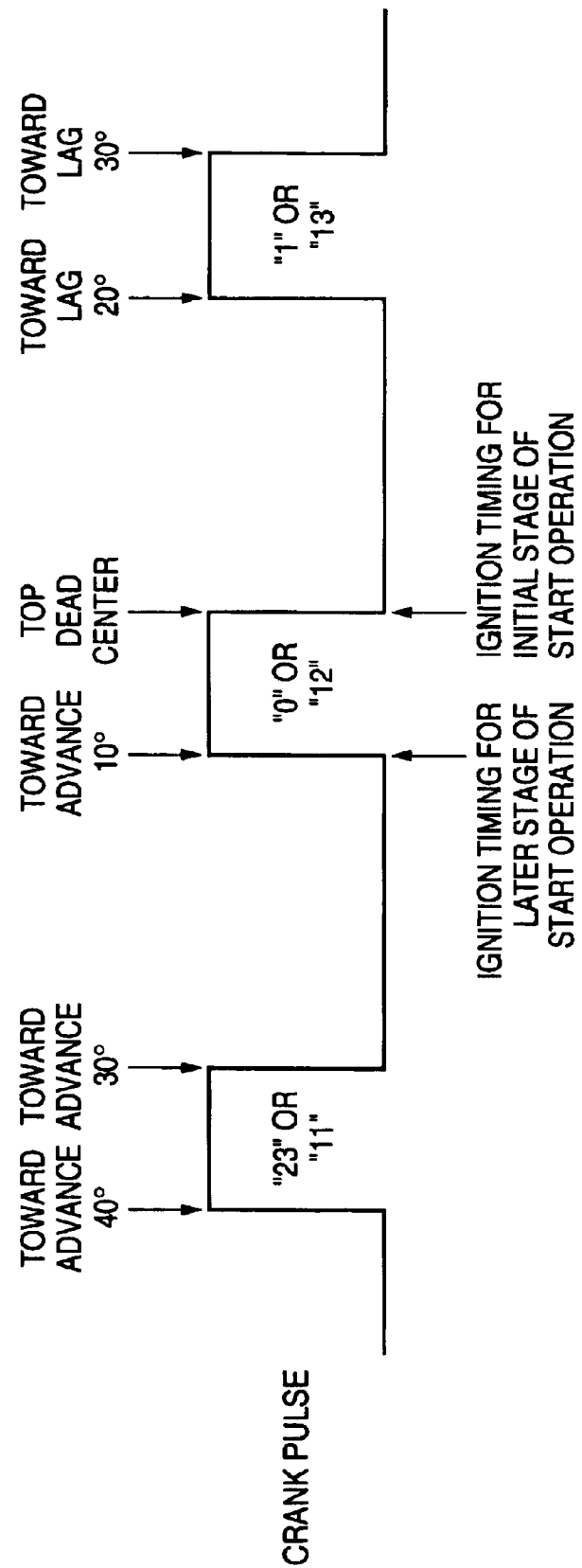
FIG. 11 is a descriptive view of an ignition timing set in FIG. 10.

In step S46, for instance, at the start-up of the engine, force derived from initial combustion is achieved, and the engine speed has reached a certain speed (however, the engine speed is not stable). For this reason, an ignition period to be employed at the later stage of the start is set per cycle to a position before the compression top dead center and 10° in advance; that is, the trailing edge of the crank pulse "0" shown in FIG. 3 or 11 ±a crankshaft rotational angle of 10°. Processing then returns to the main program. Here, the expression "±the crankshaft rotational angle of 10°" factors in electrical or mechanical responsiveness. Substantially, ignition is performed simultaneously with the trailing edge of the crank pulse "0" or "12" shown in FIG. 2 or 4.

In step S48, a normal ignition timing is set once per stroke cycle, and processing returns to the main program. For instance, in connection with normal ignition, the highest torque is usually achieved at a point slightly offset from the top dead center toward advance. Therefore, ignition timing is adjusted with reference to that ignition timing in accordance with the driver's intention as reflected on intake pressure.

In order to cause the engine to start rotating without fail in agreement with fuel injection performed per rotation of the crankshaft at the start of cranking when stroke detection is not yet completed and before initial combustion; that is, during an initial stage of start-up, a point in the vicinity of the top dead center is taken as an ignition timing every rotation of the crankshaft, thus preventing reverse rotation of the engine. Even after the stroke is detected, ignition timing for a later stage of start-up is set at a point before compression top dead center at which comparatively high torque is achieved and in the vicinity of 10° toward advance, until the engine speed reaches a predetermined speed or more, whereby the engine speed is made stable at a higher level.

As mentioned above, in the embodiment, cylinder air mass is computed from the intake pressure and the operating state of the engine in accordance with the previously-stored cylinder air mass three dimensional map. In accordance with the previously-stored target air-fuel ratio map, a target air-fuel ratio is computed from the intake pressure and the operating state of the engine. The cylinder air mass is divided by the target air-fuel ratio, whereby the quantity of fuel to be injected can be computed. Hence, control is facilitated and rendered accurate. The cylinder air mass map is easy to measure, and the target air-fuel ratio map is easy to set. Hence, mapping operation becomes easy. Further, the necessity for using a throttle sensor for detecting engine load, such as a throttle opening sensor and a throttle position sensor, is obviated Moreover, from the intake pressure the engine is detected as being in a transition phase, such as an accelerating state or a decelerating state, thereby correcting the target air-fuel ratio. An output characteristic of the engine to be achieved at the time of acceleration or deceleration is set merely in accordance with the target air-fuel ratio. Hence, the output characteristic can be changed to satisfy the driver's requirement or so as to be close to the driver's perception.

The engine speed can also be detected readily by means of detecting the engine speed from the phase of the crankshaft. For instance, if the stroke status is detected from the phase of the crankshaft in lieu of a cam sensor, an expensive, large-scale cam sensor can be obviated.

As mentioned above, according to the embodiment which does not employ any cam sensor, detection of the phase or stroke of the crankshaft is important. However, according to the embodiment in which stroke detection is performed through use of only the crank pulse and the intake pressure, a stroke cannot be detected without the crankshaft rotating at least twice. However, a stroke in which the engine comes to a halt is unknown; in other words, a stroke from which cranking is started is unknown. For these reasons, in the embodiment, fuel is injected at a predetermined crank angle every rotation of the crankshaft through use of the crank pulse from start of cranking operation until the stroke is detected, and ignition is effected in the vicinity of the compression top dead center every rotation of the crankshaft. From the time of detection of the stroke, fuel injection which permits attainment of a target air-fuel ratio corresponding to the throttle opening is performed once per cycle. However, before the engine speed reaches a predetermined speed or higher, ignition is performed at a point before the compression top dead center at which torque is easy to achieve and in the vicinity of 10° toward advance.

Figure 12:
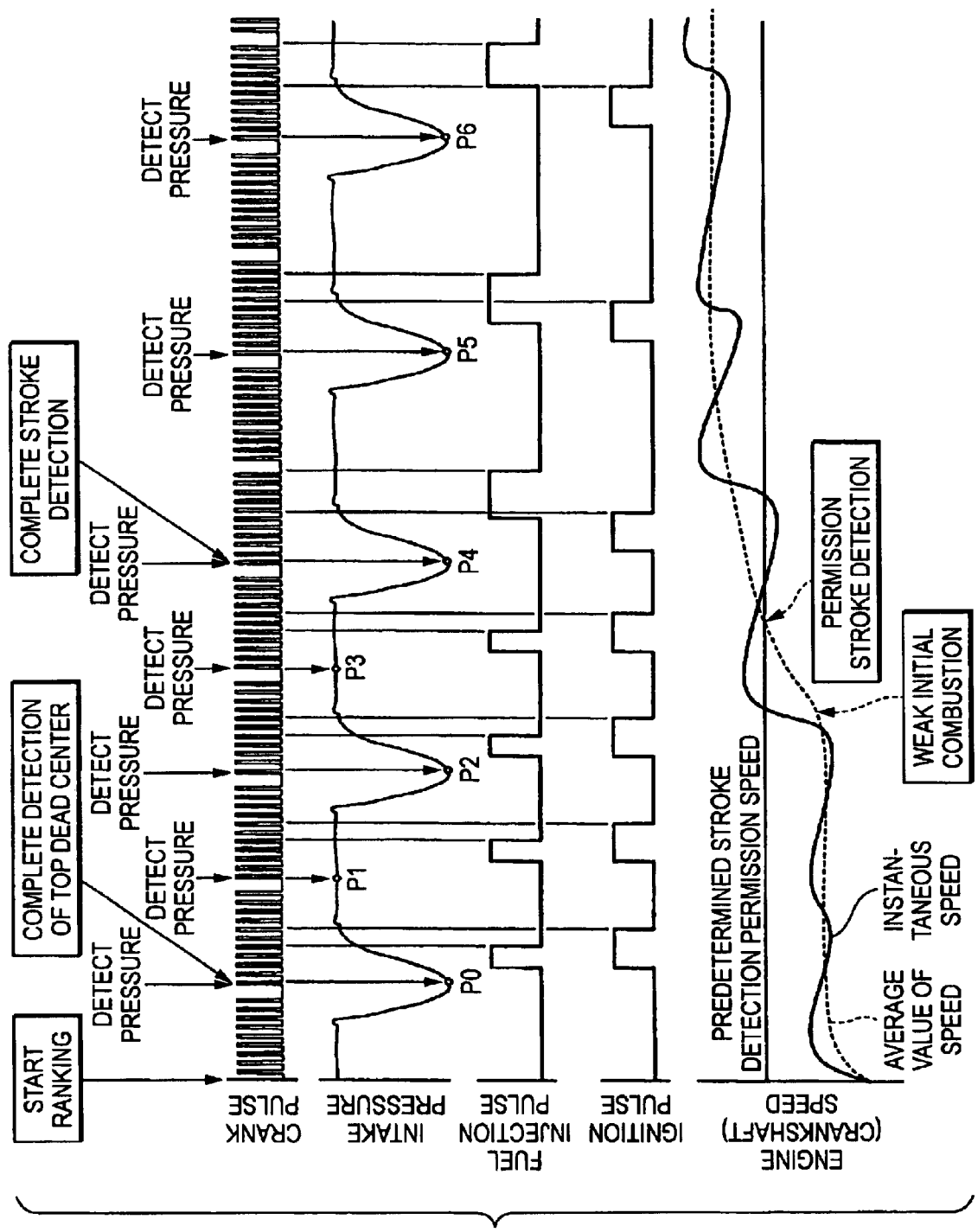
FIG. 12 is a descriptive view of operation to be achieved at the time of start-up of an engine through the computation processing shown in FIG. 3.

FIG. 12 shows time-elapsing changes in the engine speed (the number of rotations of the crankshaft), those in the fuel injection pulse, and those in the ignition pulse, which arise when comparatively-small combustion-derived force is obtained as a result of initial combustion having occurred as a result of previously-described control of fuel injection and ignition timing. As mentioned previously, before an average value of engine speed reaches the predetermined stroke detection permission speed or higher after initial combustion has occurred, the ignition pulse is output in accordance with the trailing edge of the crank pulse "0" or "12" shown in FIG. 3 (numbering performed at this point in time is not accurate) every rotation of the crankshaft. A fuel injection pulse is output in accordance with the trailing edge of the crank pulse "10" or "22" shown in FIG. 4 (numbering performed at this point in time is not accurate) every rotation of the crankshaft. Specifically, settings are made such that ignition is performed at the end of the ignition pulse; that is, the trailing edge of the ignition pulse and such that fuel injection is completed at the end of the fuel injection pulse; that is, the trailing edge of the fuel injection pulse.

As mentioned above, the illustrated first and second fuel injection operations are based on the total quantity of fuel to be injected set on the basis of the temperature of cooling water; that is, the temperature of the engine, in the manner set forth. In the meantime, there are obtained intake pressure $P_0$ of crank pulse "18" corresponding to the intake stroke, and intake pressure $P_1$ of crank pulse "6" corresponding to the expansion stroke. Further, a difference between these intake pressure levels is equal to or higher than a predetermined level at which stroke detection can be performed. Therefore, third and fourth fuel injection operations are based on the total quantity of fuel to be injected set on the basis of a lower intake pressure level of the two pressure levels; that is, the intake pressure Po of the crank pulse "18" corresponding to the intake stroke.

Since weak initial combustion-derived force is obtained by means of the fuel injection and ignition control, the average value of engine speed increases gently. When the engine speed has reached the predetermined stroke detection enabling speed or higher, stroke detection is permitted. Hence, stroke detection is performed by comparing the intake pressure achieved this time with the intake pressure achieved last time at the same crank angle as that used this time. At this time, the result of stroke detection reveals that the previous fuel injection is performed immediately before the intake stroke, and hence in subsequent strokes fuel which permits achievement of the target air-fuel ratio is injected once per cycle at ideal timing. After detection of the stroke, the ignition timing is set once per cycle. However, the temperature of cooling water has not yet reached the predetermined level, and the idling speed has not yet become stable. Hence, the ignition timing is set at 10° toward advance before the compression top dead center; that is, the leading edge of the crank pulse "0" shown in FIG. 3, to thus output an ignition pulse. As a result, in subsequent cycles, the engine speed increases immediately.

Figure 13:
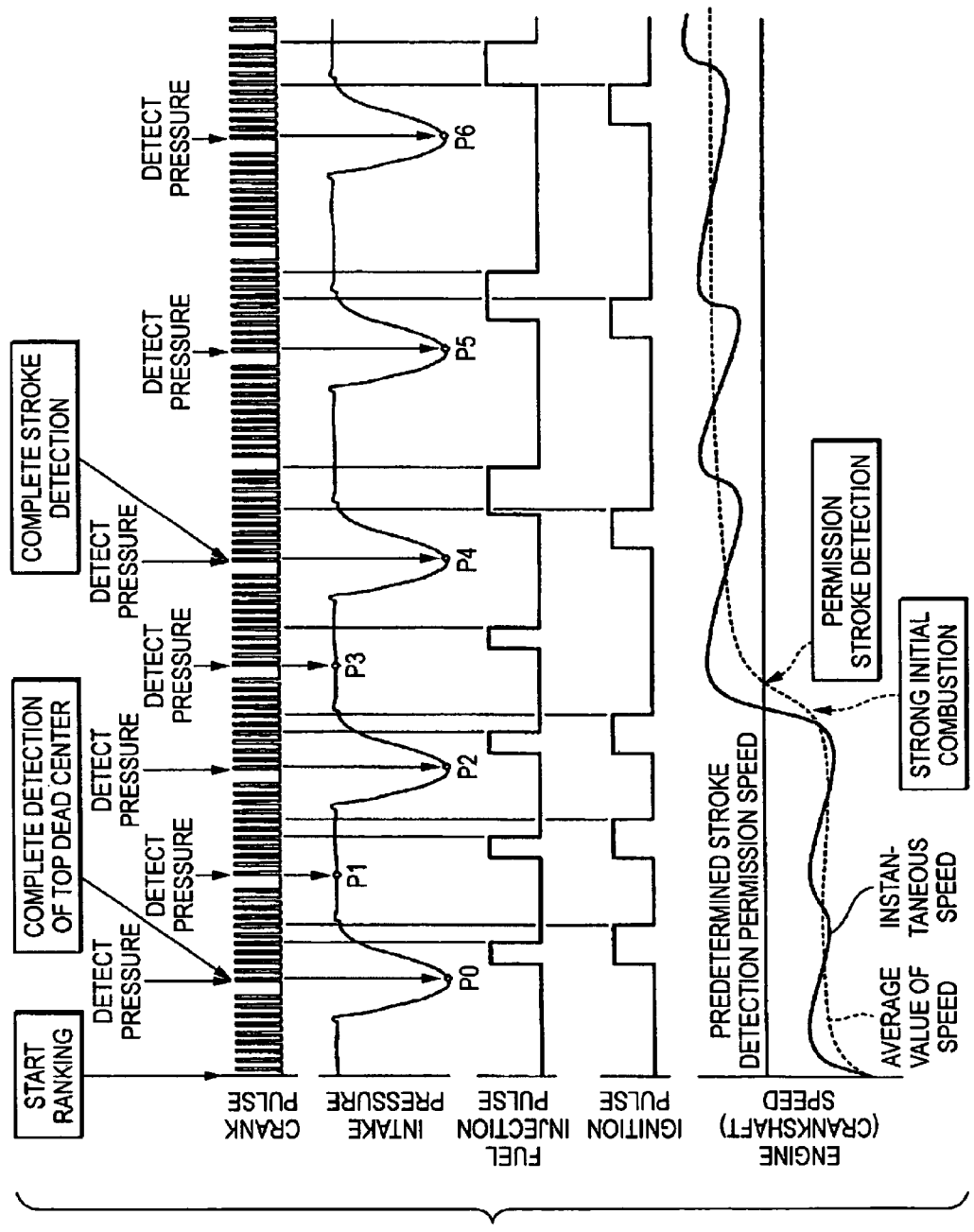
FIG. 13 is a descriptive view of operation to be achieved at the time of start-up of an engine through the computation processing shown in FIG. 3.

FIG. 13 shows time-elapsing changes in the engine speed (the number of rotations of the crankshaft), those in the fuel injection pulse, and those in the ignition pulse, which arise as a result of similar fuel injection and ignition control being performed at the time of cranking operation when large force derived from initial combustion is made. When initial combustion-derived force is strong as mentioned above, the average value of engine speed increases quickly, and the predetermined stroke detection enabling speed or higher is achieved within a short period of time, whereupon stroke detection is permitted. At this time, the result of stroke detection reveals that the previous fuel injection is not performed immediately before the intake stroke; specifically, in the expansion stroke. Therefore, the same quantity of fuel is again injected at the same crank angle as that employed last time, to thus permit intake of an ideal quantity of fuel in a subsequent intake stroke. As a result, start of the engine can be made stable.

As mentioned above, in the embodiment, fuel is injected at a predetermined crank angle per rotation of the crank shaft until a stroke is detected, and ignition is effected in the vicinity of the compression top dead center every rotation of the crankshaft, whereby weak initial combustion-derived force can be ensured without fail and reverse rotation of the engine can be prevented. Specifically, if ignition is effected at a point toward advance before the compression top dead center before initial combustion-derived force is produced, the engine may undergo reverse rotation. After the stroke is detected, fuel injection and ignition are performed once per cycle. Ignition is performed at a point before the compression top dead center and in the vicinity of 10° toward advance, whereby the engine speed can be increased rapidly.

If fuel injection and ignition are performed once per cycle; that is, once every two rotations of the crankshaft, before detection of a stroke, initial combustion-derived force will not be produced without fail when fuel injection is performed after intake or ignition is performed at a point offset from the compression top dead center. Specifically, there may arise cases where the engine starts smoothly and cases where the engine fails to start smoothly. If fuel injection is performed once per rotation of the crankshaft after detection of a stroke, fuel must be continuously injected in a two-wheeled vehicle involving a high engine speed range. As a result, limitations are imposed on the dynamic range of the injector. Continued ignition being performed once per rotation of the crankshaft after detection of a stroke results in waste of energy.

The embodiment has described the engine of manifold injection type in detail. However, the engine controller of the invention can also be applied in the same manner to an engine of direct injection type.

Although the embodiment has also described the single cylinder engine in detail, the engine controller of the invention can also be applied in the same manner to a so-called multi cylinder engine having two or more cylinders.

In the engine control unit, various processing circuits can also be used as substitutes for the microcomputer.

INDUSTRIAL APPLICABILITY

As is described, an engine controller according to claim 1 of the invention is configured to set a predetermined phase of a crankshaft as ignition timing per rotation of the crankshaft at the time of start-up of an engine until the stroke detection means detects the stroke of the engine. Since the predetermined phase of the crankshaft is set as a phase of the crankshaft corresponding to at least an expansion stroke, combustion is ensured reliably by injection of an appropriate quantity of fuel at appropriate timing, to thus permit start-up of the engine.

An engine controller according to claim 2 of the invention is configured to set the top dead center or a point located in the vicinity thereof as ignition timing when a detected engine speed is equal to or lower than a predetermined speed. Hence, there can be prevented occurrence of reverse rotation of the engine, which would otherwise arise at the initial stage of starting operation during which the engine speed does not become stable.

An engine controller according to claim 3 of the invention is configured to set a predetermined phase located toward advance with reference to the top dead center or a point located in the vicinity thereof as ignition timing when the detected engine speed is equal to or higher than the predetermined speed. Hence, the engine speed can be increased without fail at the later stage of the start-up operation during which the engine speed has become stable to a certain extent.

An engine controller according to claim 4 of the invention is configured to set half the quantity of fuel required for one stroke cycle as the quantity of fuel per rotation of the crankshaft, at the start of the engine until the stroke detection means detects the stroke of the engine. Fuel injection timing is set appropriately, and ignition is effected appropriately during an expansion stroke, whereby combustion occurs without fail to permit start of the engine.

An engine controller according to claim 5 of the invention is configured such that, when a difference between intake pressure levels achieved in a predetermined phase of the crankshaft achieved during the course of two rotations of the same is equal to or higher than a predetermined value, the quantity of fuel computed on the basis of a smaller intake pressure level is set as the quantity of fuel required for one stroke cycle and such that, when the intake pressure difference is below the predetermined value, the quantity of fuel computed on the basis of the temperature of the engine is set to the quantity of fuel required for the one stroke cycle. In any cases, if ignition can be achieved appropriately during the course of the expansion stroke, sufficiently-required combustion-derived force is obtained to permit appropriate start of the engine.

An engine controller according to claim 6 of the invention is configured to permit detection of an engine stroke when the detected engine speed is equal to or higher than the predetermined speed. Therefore, a stroke can be accurately detected on the basis of a stable crank pulse.

What is claimed is:

1. An engine controller, comprising:
    cogs formed at uneven intervals on a crankshaft or an outer periphery of a member which rotates in synchronism with said crankshaft;
    crank pulse generation means which transmits a pulse signal in association with said crankshaft approaching said cogs;
    crankshaft phase detection means which detects as a crank pulse a pulse signal transmitted from said crank pulse generation means and detects the phase of said crankshaft from said crank pulse;
    intake pressure detection means for detecting intake pressure within an intake path of an engine;
    stroke detection means for detecting a stroke of said engine on the basis of said phase of said crankshaft detected by said crankshaft phase detection means and said intake pressure detected by said intake pressure detection means;
    engine control means for controlling a operating state of said engine on the basis of the stroke of said engine detected by said stroke detection means; and
    ignition timing setting means for use in a case where a stroke is not yet detected, which sets half the quantity of fuel required for one stroke cycle as the quantity of fuel per rotation of the crankshaft, at the start of the engine until the stroke detection means detects the stroke of the engine.

2. The engine controller according to claim 1, further comprising:
    engine temperature detection means for detecting the temperature of said engine, wherein
    said ignition timing setting means sets, as the quantity of fuel required for one stroke cycle, the quantity of fuel computed on the basis of a smaller intake pressure level from among intake pressure levels detected by said intake pressure detection means when a difference between the intake pressure levels achieved in a predetermined phase of the crankshaft during the course of two rotations of the same detected by said crankshaft phase detection means is equal to or higher than a predetermined value and sets, as the quantity of fuel required for one stroke cycle, the quantity of fuel computed on the basis of the temperature of the engine detected by the engine temperature detection means when the intake pressure level difference is below the predetermined value.

3. An engine controller, comprising:
    cogs formed at uneven intervals on a crankshaft or an outer periphery of a member which rotates in synchronism with said-crankshaft;
    crank pulse generation means which transmits a pulse signal in association with said crankshaft approaching said cogs;
    crankshaft phase detection means which detects as a crank pulse a pulse signal transmitted from said crank pulse generation means and detects the phase of said crankshaft from said crank pulse;
    intake pressure detection means for detecting intake pressure within an intake path of an engine;
    stroke detection means for detecting a stroke of said engine on the basis of said phase of said crankshaft detected by said crankshaft phase detection means and said in take pressure detected by said intake pressure detection means;
    engine control means for controlling a operating state of said engine on the basis of the stroke of said engine detected by said stroke detection means; and
    ignition timing setting means for use in a case where a stroke is not yet detected, which sets a predetermined phase of said crankshaft as ignition timing every rotation of said crankshaft at the start of said engine until said stroke detection means detects a stroke of said engine.

4. The engine controller according to claim 3, further comprising:
    engine speed detection means for detecting an engine speed, wherein
    said ignition timing setting means sets the top dead center or a point located in the vicinity thereof as ignition timing when the engine speed detected by said engine speed detection means is equal to or less than a predetermined speed.

5. The engine controller according to claim 3 or 4, further comprising:
    engine speed detection means for detecting an engine speed, wherein
    said ignition timing setting means sets a predetermined phase located toward advance with reference to the top dead center or a point located in the vicinity thereof as ignition timing when the engine speed detected by the engine speed detection means is equal to or higher than the predetermined speed.

6. The engine controller according to claim 3 or 1, further comprising:
    engine speed detection means for detecting an engine speed; and
    stroke detection enabling means for enabling said stroke detection means to detect a stroke of said engine when the engine speed detected by said engine speed detection means is equal to or higher than a predetermined speed.

* * * * *